US011816276B2

(12) United States Patent
Kleffel et al.

(10) Patent No.: US 11,816,276 B2
(45) Date of Patent: Nov. 14, 2023

(54) INPUT DEVICE WITH MOVABLE HANDLE ON CAPACITIVE DETECTION SURFACE AND CAPACITIVE COUPLING DEVICES

(71) Applicant: Preh GmbH, Saale (DE)

(72) Inventors: Thomas Kleffel, Höchberg (DE); Norbert Bauer, Bad Neustadt (DE)

(73) Assignee: PREH GMBH, Saale (DE)

( * ) Notice: Subject to any disclaimer, the term of this patent is extended or adjusted under 35 U.S.C. 154(b) by 0 days.

(21) Appl. No.: 17/596,250

(22) PCT Filed: Mar. 31, 2020

(86) PCT No.: PCT/EP2020/059086
§ 371 (c)(1),
(2) Date: Dec. 6, 2021

(87) PCT Pub. No.: WO2020/249285
PCT Pub. Date: Dec. 17, 2020

(65) Prior Publication Data
US 2022/0317785 A1    Oct. 6, 2022

(30) Foreign Application Priority Data
Jun. 12, 2019   (DE) .......................... 102019115946.6

(51) Int. Cl.
*G06F 3/039*     (2013.01)
*G06F 3/044*     (2006.01)
*G06F 3/0362*    (2013.01)

(52) U.S. Cl.
CPC .......... *G06F 3/0393* (2019.05); *G06F 3/0362* (2013.01); *G06F 3/0446* (2019.05)

(58) Field of Classification Search
CPC .................... G06F 3/03541–03544; G06F 3/03545–03546; G06F 3/0362; G06F 3/044–0448; G06F 3/0393
See application file for complete search history.

(56) References Cited

U.S. PATENT DOCUMENTS 5,936,613 A    8/1999   Jaeger et al.
10,055,030 B2 *  8/2018   Stringer ................ G06F 3/0488
(Continued)

FOREIGN PATENT DOCUMENTS

DE     102017212056 A1     1/2019
DE     102017121896 A1     3/2019
(Continued)

OTHER PUBLICATIONS

International Search Report for International Searching Authority for PCT/EP2020/059086, ISA/EP, Rijswijk, Netherlands, Dated: Jul. 1, 2020.
(Continued)

*Primary Examiner* — Hang Lin
(74) *Attorney, Agent, or Firm* — M&B IP Analysts, LLC.

(57) ABSTRACT

An input device includes a capacitive detection device, which has a detection surface while forming a first array of array electrodes associated with the detection surface, that are arranged so as to cross one another several times while being electrically insulated to form one junction point at the locations where they cross one another; an electronic evaluation unit, which is electrically connected to the array electrodes to form an associated electric measuring field array for the spatially resolving detection of a capacitive influence on the detection surface; a handling means mounted on the detection surface movable along an adjustment path parallel to the detection surface to perform an operating input by a manually effected movement along the adjustment path; and at least one position indicator moved along with the handling means to capacitively influence at least one measuring field of the measuring field array.

11 Claims, 3 Drawing Sheets

(56) References Cited

U.S. PATENT DOCUMENTS

Figure 1:
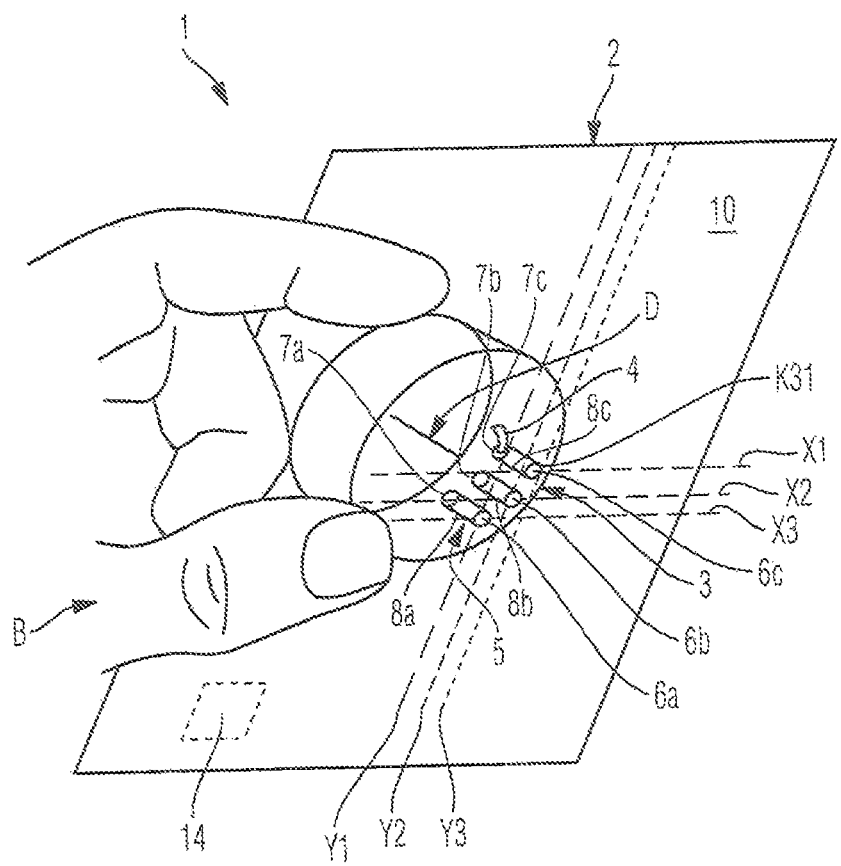

| | | | | |
|---|---|---|---|---|
| 10,318,034 B1* | 6/2019 | Hauenstein | ........... | G06F 3/0412 |
| 2014/0042004 A1* | 2/2014 | Tseng | .................... | G06F 3/0362 |
| | | | | 200/336 |
| 2014/0299365 A1* | 10/2014 | Sebastian | ............. | G06F 3/0445 |
| | | | | 216/13 |
| 2016/0224129 A1 | 8/2016 | Wussler et al. | | |
| 2016/0274694 A1* | 9/2016 | King | .................... | G06F 3/0445 |
| 2018/0088704 A1* | 3/2018 | Schlegelmilch | ...... | G06F 3/0446 |

FOREIGN PATENT DOCUMENTS

| | | |
|---|---|---|
| EP | 2511807 A2 | 10/2012 |
| GB | 2540560 A | 1/2017 |

OTHER PUBLICATIONS

The First German Office Action, for German Application No. 102019115946.6 , German Patent and Trade Mark Office, München, Germany, dated Jun. 12, 2019.
The Written Opinion for International Searching Authority for PCT/EP2020/059086, ISA/EP, Rijswijk, Netherlands, Dated: Jul. 1, 2020.

* cited by examiner

INPUT DEVICE WITH MOVABLE HANDLE ON CAPACITIVE DETECTION SURFACE AND CAPACITIVE COUPLING DEVICES

The present disclosure generally relates to an input device having a capacitive detection device, wherein the detection device has a detection surface while forming a first array of array electrodes associated with the detection surface. For example, this first array is formed of two groups of electrodes, which are arranged in groups substantially parallel to one another and so as to define a group orientation in the process, and which, from group to group and given a vertical imaginary projection onto a common plane, are disposed so as to cross one another several times, e.g. cross one another orthogonally, and in an alternating manner while being electrically insulated from one another. A regular grid structure is thus formed while forming a so-called junction point at the crossing locations. The smallest distance between most closely adjacent junction points describes the smallest periodicity of the grid structure. Usually, the smallest distance between most closely adjacent junction points in the two directions determined by the group orientation matches. For example, the detection device is a capacitive touchscreen or a capacitive touchpad. Further, an electronic evaluation unit is provided in these generic input devices, which is electrically connected to the array electrodes in order to form, by means of the first array of array electrodes, an associated electric measuring field array for the spatially resolving detection of a capacitive influence on the detection surface. The individual measuring fields of the measuring field array are usually generated by a corresponding activation in a chronological sequence.

Moreover, a handling means, whose position is to be detected by means of the detection device, is now movably disposed on the detection surface defined by the detection device. For this purpose, the handling means has a position indicator that is moved along, in order to cause an influence on at least one of the measuring fields, which can be detected by the detection device and from which position and/or movement information can be derived. Such a combination of a touchpad or touchscreen with an input device formed by a handling means movably disposed thereon is becoming increasingly popular, because flexible inputting options are being provided in this manner, and because, particularly in the case of a touchscreen, a variety of functions and function information can be associated with the handling means due to the flexible displaying options. On the other hand, however, the handling means provides a familiar haptic feedback and can easily be located by feel by the user without any visual contact. Because of the intended utilization for position detection of the region of the capacitive electrode structure, which is located underneath the handling means and covered by the handling means, a capacitive coupling between the handling means, particularly of the position indicator provided therein, and the first array of array electrodes is required. The problem of capacitive coupling, which regularly presents itself in this case, results from the fact that the path that the position indicator describes when the handling means is manually moved along the adjustment path can never be completely aligned with the structure defined by the first array of array electrodes, and that thus, the positional detection is unreliable and susceptible to error at least for some positions of the handling means.

Against this background, there was a demand for a generic input device in which an improved, i.e. more uniform, capacitive coupling, and thus an improved position detection, is obtained for all positions of the handling means, and in which particularly the capacitive coupling between the capacitive detection device, e.g. the capacitive touchscreen, and the position indicator of the handling means is improved. This object is achieved by an input device according to claim 1. An equally advantageous use is the subject matter of the independent claim. Advantageous embodiments are in each case the subject matter of the dependent claims. It should be noted that the features cited individually in the claims can be combined with each other in any technologically meaningful manner and represent other embodiments of the present disclosure. The description, in particular in connection with the figures, additionally characterizes and specifies the disclosed embodiments.

The present disclosure relates to an input device including a capacitive detection device, in which case the detection device has a detection surface while forming a first array of array electrodes associated with the detection surface. For example, the array electrodes are disposed in a common plane or on two or more parallel planes. This first array is formed of two groups of array electrodes. The array electrodes are arranged in groups substantially parallel to one another, whereby a group orientation is defined for each group. In groups, i.e. with regard to their association with a group, the array electrodes are arranged in an alternating manner. Given a vertical imaginary projection onto a common plane, they cross one another, e.g. orthogonally, while being, in actual fact, electrically insulated from one another. On the whole, a regular grid structure is thus formed in a partial region of the detection surface, which, in relation to the entire detection surface, is the largest in surface area, while forming a so-called junction point at the crossing locations, which is also understood to be a rule-compliant design of the grid structure and thus of the first array. The smallest distance between most closely adjacent junction points in the two directions defined by the group orientation describes the smallest periodicity of the grid structure. Usually, the smallest distance between the junction points in the two directions determined by the group orientation matches.

The term electrode is supposed to imply the construction of the array electrode concerned from a conductive material, e.g. of metal or a metallic alloy. For example, this is a capacitive detection device with a projected capacitive technology, in particular with a mutual-capacitance structure. In the mutual-capacitance structure, measuring fields are generated, as described above, at the junction points between, in each case, two electrically insulated array electrode structures crossing one another. In commercially available touchpads or touchscreens, the junction points are arranged in a right-angled grid.

According to the present disclosure, an electronic evaluation unit is also provided, which is electrically connected, preferably in an electrically conducting manner, to the array electrodes, in order to form, by means of the first array of array electrodes, an associated array of electric measuring fields, hereinafter referred to as a measuring field array, which is preferably generated in a sequence in time and varies in time, for the spatially resolving detection of a capacitive influence on the detection surface. In general, the position of the measuring fields to be generated by the array electrodes is defined in each case by the position of the junction points.

The evaluation unit is capable of measuring the influence on the capacitively generated measuring fields. If the respective measuring field is influenced by the external approach of an object, the electrical influence measured by the evaluation unit, e.g. at the respective junction point, is altered and detected, and can be associated with a location on the detection surface due to the array electrode structure, which is preferably provided with a pattern of rows and columns.

According to the present disclosure, the input device includes a handling means, which is disposed on the detection surface by means of a supporting means, preferably attached by means of the supporting means, so as to be movable along an adjustment path parallel to the detection surface, in order to perform an operating input in the case of movement, particularly while the handling means is touched by an operator. For example, this is a handling means that is mounted so as to be translationally movable along a linear adjustment path in a direction parallel to the detection surface. Preferably, the handling means is mounted on the detection surface in a manner rotatable about an axis of rotation orthogonal to the detection surface, thus qualifying the handling means of the input device as a rotary adjuster.

According to the present disclosure, a position indicator moved along with the handling means, which thus moves synchronously with the handling means, is also provided, wherein the position indicator describes at least one path across the detection surface when the handling means is manually displaced along the adjustment path. The position indicator is provided for capacitively influencing at least one measuring field of the measuring field array in a position-dependent manner, because an electric potential is applied thereto. For example, this is an electrical conductor which is configured, for example, as a spring tongue. For example, the position indicator is configured so as to be electrically insulated from the evaluation unit. It may have a single-part of multi-part configuration, with the several parts preferably being connected in an electrically conductive manner. In one configuration, the position indicator is connected in an electrically conductive manner with the surface of the handling means facing towards the operator, in order to be charged or discharged to the electrical potential of the operator when touched by the latter.

According to the present disclosure, given a projection, vertical to the detection surface, of the path onto the plane containing the grid structure, a smaller partial region of the grid structure, which is situated outside the largest partial region and at least partially contains the projection of the path, is configured so as to deviate from the regular grid structure in such a way that several of the junction points located within the partial region are respectively offset from their imaginary, rule-compliant position in such a manner that the distance from the projection of the path, for the respective junction point, is at least minimized compared with that of the rule-compliant position. In other words, a deviation is made locally from the predominantly regular grid structure by means of a non-rule-compliant configuration, also referred to as a deformation, with the goal that several, preferably a plurality of the junction points, most preferably all of the junction points, are positioned in the non-rule-compliant partial region with an offset in the direction of the projection of the path of the position indicator, compared to their position predefined by a rule-compliant design, or are even contained in the projected surface of the path.

According to a preferred embodiment, it is thus provided that, given a projection, vertical to the detection surface, of the path onto the plane of the grid structure, several, preferably the majority, more preferably all, of the junction points located within the partial region are disposed on the path of the position indicator. Still more preferably, the junction points located within the partial region are arranged so as to be distributed in a uniformly spaced-apart manner across the extent of the projection of the path defined by the adjustment path.

According to a preferred embodiment, a coupling device disposed so as to rest on the detection surface, e.g. fixed to the detection surface, is provided for the position-dependent capacitive coupling between the position indicator and the first array of array electrodes. It may have a single-part or multi-part configuration. It has a first surface, which faces towards the detection surface and on which a second array of coupling electrodes for capacitive coupling with the above-described array electrodes is formed. The coupling device further has a second surface, which faces towards the position indicator and faces away from the detection surface, and on which a third array consisting of several spaced-apart contact surfaces is formed. These contact surfaces are arranged in such a manner that, selectively and dependent on the position of the handling means along the adjustment path, they are touch-contacted by the position indicator. Further, the coupling device contains several electrically conductive connections, the number of which corresponds to at least the number of contact surfaces. The electrically conductive connections are configured to connect, in each case, one of the coupling electrodes with one contact surface in an electrically conductive manner. The contact surfaces, the coupling electrodes and the electrically conductive connections are made from an electrically conductive material. The contact surfaces, the coupling electrodes and/or the electrically conductive connections are formed, for example, as conductive coatings of a substrate. In one configuration, the electrically conductive connection, the associated contact surface and the associated coupling electrode are in each case integrally formed, e.g. as a column-shaped conductor.

Thus, the electronic evaluation unit is configured for detecting the influence on the measuring field due to at least one capacitive coupling, wherein the contact surface selected in this case is determined by the position of the position indicator and the capacitive coupling arises in each case between the coupling electrode, which is contacted in a position-dependent manner by the position indicator via the contact surface and the respective electrical connection, and the adjacently disposed and associated measuring field of the measuring field array generated by the first array of array electrodes. As was explained above, it is possible, for example, that due to multiple capacitive couplings, an influence on several measuring fields of different array electrodes occurs in one or several positions of the position indicator, because according to one configuration, the contact surface is connected to several coupling electrodes in an electrically conductive manner via, in each case, one connection, or the position indicator contacts several contact surfaces in parallel in a single position, or several position indicators are provided. The electronic evaluation unit is capable of detecting the previously explained position-dependent influence on the measuring fields in order to obtain and output a positional information and/or movement information of the handling means. In other words, the evaluation unit is capable of identifying the respective position based on the influence on the respective measuring fields that depends on the position of the handling means and is caused by the position indicator, and thus associate a positional information with the influence and output it to a higher-level control device for performing a controlling or switching function, for example.

Preferably, a latching device is provided for generating latching haptics and for predefining predefined positions along the adjustment path of the handling means. For example, the latching device has a latching lug and a latching contour, wherein the latching lug is in operative engagement with the latching contour and is biased against the latching contour, and runs on the latching contour when the handling means is displaced, in order to engage a latching depression in each case after overcoming a latching protrusion, wherein the latter define the predefined positions.

According to one configuration, the position indicator is connected in an electrically conductive manner to a conductive surface configured and arranged for being touched by an operator, so that it can thereby be provided with a potential. Preferably, however, it is provided that the coupling device is configured in such a manner that the position indicator is capacitively coupled, via the coupling device, to an electric field of at least one array electrode.

Preferably, the coupling device has at least one feed electrode on its first surface and at least one feed contact surface electrically conducting therewith on its second surface, by means of which the position indicator is in touching contact at least in the predefined positions in order to capacitively couple the position indicator to the electric field of at least one array electrode.

Furthermore, the present disclosure relates to the use of the input device in one of the above-described embodiments in a motor vehicle.

Figure 2:
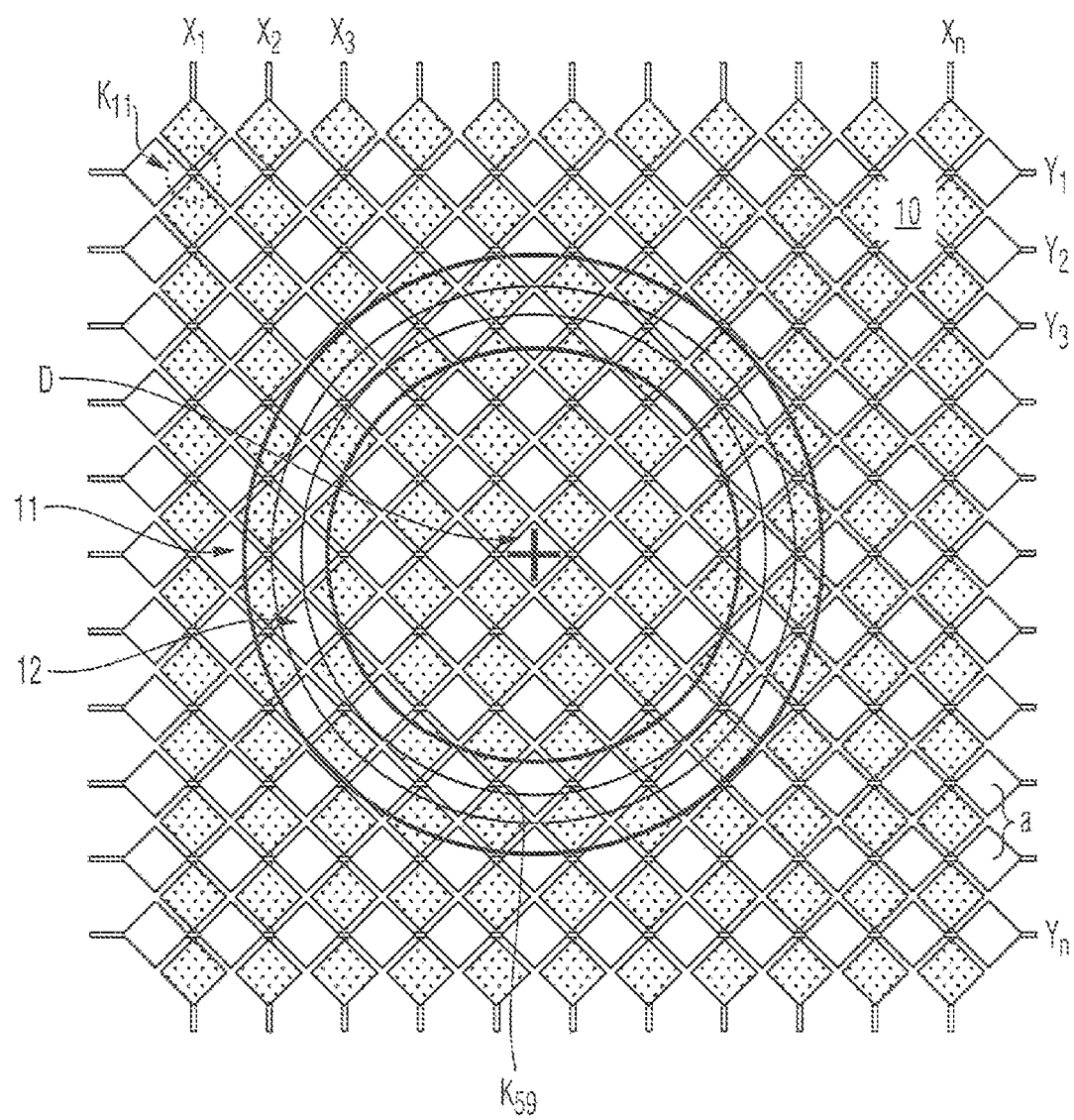
Figure 3:
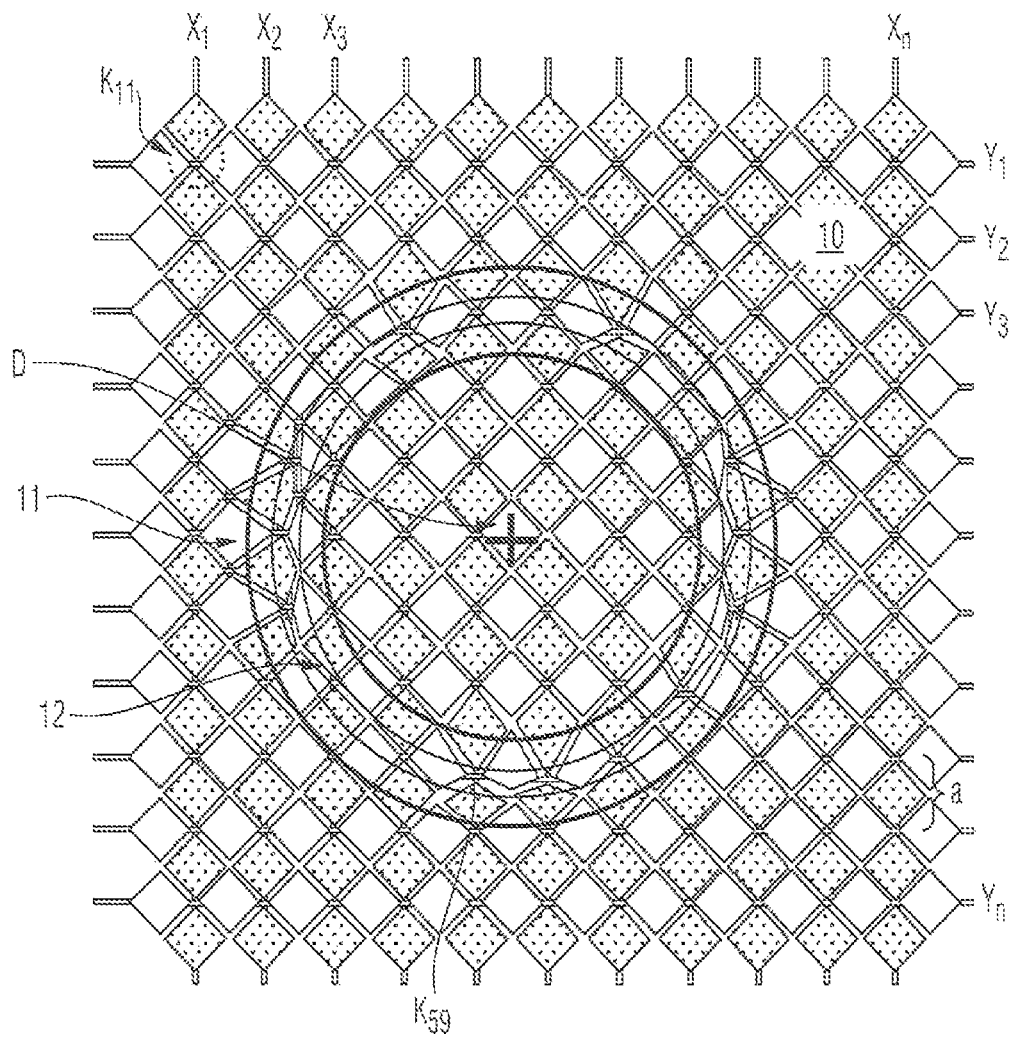

The various embodiments explained further with reference to the following Figures. The Figures are to be understood only as examples and merely represent preferred variants of the embodiments. In the Figures:

FIG. 1 shows a perspective top view of an input device 1 according to an embodiment;

FIG. 2 shows an illustration of the problem to be solved that is caused when the first array of array electrodes of the detection surface of FIG. 1 is configured as being rule-compliant across the entire plane of a grid structure; and FIG. 3 shows an illustration of a solution to the problem to be solved of FIG. 2 by forming a partial region of the detection surface of FIG. 1 in which the electrodes deviate from the regularity shown in FIG. 2.

FIG. 1 shows an input device 1 according to an embodiment, with a touchscreen functioning as a capacitive detection device 2. The detection device 2 defines a detection surface 10 facing towards the operator B, on which a handling means 3 is disposed so as to be mounted rotatably about an axis of rotation D by means of the supporting means, which are not shown in FIG. 1 for better clarity, thus forming a so-called rotary adjuster. The capacitive detection device 2 has array electrodes X1 to X3 that extend substantially parallel to each other, and array electrodes Y1 to Y3 extending perpendicularly thereto as counter electrodes, whereby a first array is formed. The first array of array electrodes X1 to X3, Y1 to Y3 is not depicted in full and to scale in the Figures and is only supposed to serve for the schematic illustration of the general structure. The crossing points of the array electrodes X1 to X3 with the array electrodes Y1 to Y3 each form an imaginary junction point which is in each case the starting point of a capacitive measuring field. The resulting grid structure is the result of a projection onto a common plane vertical to the detection surface 10. For reasons of clarity, only one junction point, i.e. K31, is labeled more clearly in FIG. 1. The numbering of the other junction points is analogous therewith.

An electronic evaluation unit 14 is electrically connected to the array electrodes X1 to X3 and Y1 to Y3, which, for generating an associated measuring field, applies an associated potential in each case to some of the array electrodes, e.g. to the electrodes X1 to X3, selectively and in a sequence in time, in order to detect a touch by the operator B or, depending on the position of the respective junction points relative to the handling means 3, a position of the handling means 3, based on the influence on these measuring fields. In order to influence the respective measuring fields, the handling means 3 has on the side thereof facing towards the detection surface 10 a position indicator 4, which in the present embodiment is disposed in an electrically insulated manner with respect to the operator B while the latter touches the handling means 3, and which, instead of the potential of the body of the operator being applied thereto, is coupled to the electrical field of at least one of the array electrodes. Several predefined positions are provided, in particularly ones that are uniformly distributed across the adjustment path of the handling means 3, of which one possible position is shown in FIG. 1. These positions are predefined by a latching device that is not shown.

For an improved capacitive coupling between the position indicator 4 and, depending on the position, one of the measuring fields located at the junction points K11 to K33, a coupling device 5 disposed so as to rest on the detection surface 10 is provided, which is not an absolute requirement, however.

It has a first surface facing towards the detection surface 10 and a second surface facing towards the position indicator 4. For example, the first surface is disposed adjacent to the detection surface, or fixed thereto. The first surface carries a second array of coupling electrode 6a, 6b, 6c, of which only a portion is shown in FIG. 1, while the second surface carries a third array of contact surfaces 7a, 7b, 7c, only a portion of which is also shown in FIG. 1. The placement of the coupling electrodes 6a, 6b, 6c of the second array on the first side is substantially congruent with the placement of the contact surfaces 7a, 7b, 7c of the third array on the second side.

The problem to be solved by the embodiments according to the disclosed embodiment, of which one is shown schematically in FIG. 3, is explained based on FIG. 2. Given a strictly rule-compliant configuration, i.e. a configuration of the first array of array electrodes X1 to Xn, Y1 to Yn that is rule-compliant across the entire plane of the grid structure, there is the problem that the vertical projection of the path 12 of the position indicator labelled 4 in FIG. 1 onto the previously mentioned plane of the grid structure describing the first array contains only few junction points, or that the distance of the projected path 12 from some junction points is comparatively large. The path 12, or the vertical projection thereof, results from the movement of the position indicator 4 when the handling means 3 moves along the adjustment path, and is defined, for example, by the region of the touch between the coupling device 5 and the position indicator 4 if a coupling device 5 is provided. As was shown, the projection of the path 12 contains only a few junction points and not, for instance, the junction point K59, which can be ascribed to the fact that this projected path 12 cannot brought into alignment with the position of the junction points K59, which is predefined by the grid structure and is thus rule-compliant.

In order to solve this problem, in the design according to the disclosed embodiment shown in FIG. 3, the grid structure, in a partial region 11 of the detection surface 10, which is defined by the first array of array electrodes X1 to Xn and Y1 to Yn of the touchscreen and whose surface area constitutes less than 50% of the total surface area of this detection surface 10, is formed so as to deviate from the regularity as predefined outside the partial region 11. In the partial region 11, this therefore results in a non-rule-compliant configuration, in which the smallest distance a between most closely adjacent junction points, as it is maintained outside the partial region 11, is no longer stringently maintained in the partial region 11. The goal of the deformation of the grid structure, which is now provided in the partial region 11, is to offset the majority to all of the junction points located in the partial region 11, such as the junction point K59, relative to its rule-compliant placement in such a manner that, given a vertical projection of the path 12 of the position indicator 4 from FIG. 1 onto the detection surface 10, it is disposed within the surface described by this projected path 12. It is thus achieved that the clear distance between the position indicator 4 and the junction points relevant for position detection, such as junction point K59, which, depending on the embodiment, is to be bridged with or without a coupling device 5, is not only minimized compared with that of its imaginary, rule-compliant placement, but is incorporated in the projected surface of the path 12. An improved capacitive coupling with the electrical measuring fields, which originate at these coupling points, such as the coupling point K59, is thereby achieved. The overall result is an improved position detection.

What is claimed is:

1. An input device, comprising:
   a capacitive detection device, which has a detection surface while forming a first array of array electrodes associated with the detection surface, wherein the first array is formed of two groups of array electrodes, which are arranged in groups substantially parallel to one another and, in groups, in an alternating manner, and, given a vertical imaginary projection onto a common plane, are arranged so as to cross one another several times while being electrically insulated from one another while forming junction points at locations where they cross one another, wherein a regular grid structure with a rule-compliant positioning of the junction point is formed in a largest partial region of the detection surface which, in relation to the detection surface, is the largest in surface area;
   an electronic evaluation unit, which is electrically connected to the array electrodes, in order to form, by means of the first array of array electrodes, a measuring field array for spatially resolving detection of a capacitive influence on the detection surface;
   a handling means, which is mounted on the detection surface in a manner movable along an adjustment path parallel to the detection surface, in order to perform an operating input by means of a manually effected movement along the adjustment path;
   at least one position indicator moved along with the handling means to capacitively influence, in a position-dependent manner, at least one measuring field of the measuring field array; wherein the at least one position indicator-describes at least one path across the detection surface when the handling means is manually displaced along the adjustment path;
   and wherein the electronic evaluation unit is configured for detecting the position-dependent influence on the measuring field array caused by the at least one position indicator to obtain and output at least one of: a positional information and a movement information of the handling means, characterized in that given a projection, vertical to the detection surface, of the at least one path onto the plane of the regular grid structure, a smaller partial region of the regular grid structure, which is situated outside the largest partial region and at least partially contains the at least one path, is configured to deviate from the regular grid structure in such a way that several of the junction points located within the smaller partial region are offset from an imaginary, rule-compliant position in such a manner that a distance from the at least one path, for the respective junction point, is at least minimized compared with a distance of the imaginary, rule-compliant position.

2. The input device according to claim 1, wherein, given a projection, vertical to the detection surface, of the at least one path onto the plane of the regular grid structure, several of the junction points located within the largest partial region are disposed within the projection of the at least one path of the at least one position indicator.

3. The input device according to claim 1, wherein the junction points located within the largest partial region are arranged to be distributed in a uniformly spaced-apart manner across the projection of the at least one path defined by the adjustment path.

4. The input device according to claim 1, wherein a coupling device is disposed to rest on the detection surface, with a first surface, which faces towards the detection surface and on which a second array of coupling electrodes for capacitive coupling with the array electrodes is formed, and with a second surface, which faces towards the at least one position indicator and faces away from the detection surface, and on which a third array consisting of several spaced-apart contact surfaces is formed, wherein the contact surfaces are arranged in such a manner that, selectively and dependent on the position of the handling means along the adjustment path, are touch-contacted by the at least one position indicator; and
   the coupling device contains several electrically conductive connections, a number of which corresponds to at least the number of the contact surfaces, and which are configured to connect, in each case, one of the coupling electrodes with one of the contact surfaces in an electrically conductive manner.

5. The input device according to claim 1, wherein a latching device is provided for generating latching haptics and for predefining predefined positions along the adjustment path of the handling means.

6. The input device according to claim 4, wherein the coupling device is configured in such a manner that the at least one position indicator is coupled, via the coupling device, to at least one of the array electrodes of the first array.

7. The input device according to claim 1, wherein the input device is used in a motor vehicle.

8. The input device according to claim 1, wherein the smaller partial region is configured to deviate from the regular grid structure in such a way that majority of the junction points located within the smaller partial region are offset from the imaginary, rule-compliant position.

9. The input device according to claim 1, wherein the smaller partial region is configured to deviate from the regular grid structure in such a way that all of the junction points located within the smaller partial region are offset from the imaginary, rule-compliant position.

10. The input device according to claim 1, wherein, given a projection, vertical to the detection surface, of the at least one path onto the plane of the regular grid structure, all of the junction points located within the largest partial region are disposed within the projection of the at least one path of the at least one position indicator.

11. The input device according to claim 1, wherein the manually effected movement of the handling means along the adjustment path is performed while the handling means is touched by an operator.

\* \* \* \* \*